UNITED STATES PATENT OFFICE.

STEPHEN D. WILLIS, OF TERRE HAUTE, INDIANA.

MEDICAL COMPOUND.

SPECIFICATION forming part of Letters Patent No. 327,847, dated October 6, 1885.

Application filed August 3, 1885. Serial No. 173,441. (No specimens.)

*To all whom it may concern:*

Be it known that I, STEPHEN D. WILLIS, a citizen of the United States, residing at Terre Haute, in the county of Vigo and State of Indiana, have invented certain new and useful Improvements in Medicinal Compounds; and I do hereby declare the following to be a full, clear, and exact description of the invention, such as will enable others skilled in the art to which it appertains to make and use the same.

This invention relates to an improved medicinal compound designed for the treatment of chronic diseases—as dyspepsia, nervous diseases, headache, neuralgia, palpitation of the heart, bronchitis, asthma, and catarrh; for the treatment of inflammatory diseases, as rheumatism, for sore throat, and enlargement of the tonsils and spleen; and also for treatment of diseases of the womb, painful and suppressed menstruation, change of life, scrofula, syphilis, and all blood diseases.

This compound is composed of the following ingredients, mixed and compounded in about the proportions and in the manner specified hereinafter: I take of good rhubarb, one-fourth pound; of Cape aloes, (mild,) one-fourth pound; of golden-seal, one-eighth pound; of blue cohosh, one-eighth pound, and of capsicum, one-sixteenth pound, and reduce them all to a powder, and thoroughly combine or mix them together while dry. I then take one-eighth pound of powdered licorice and dissolve it in one-half pint of boiling water, and knead the above compound or mixture with this latter until it is brought to the consistency of dough. Into this mass is worked an ounce of glycerine for maintaining it in a soft or moist condition, by which the mass may be rolled into sticks of suitable sizes or proportions, when they are placed in a suitable position to dry, either in the atmosphere or otherwise. The compound thus prepared is employed in the treatment of the diseases above enumerated; but for weak lungs, coughs, colds, consumption, or hemorrhage of the lungs, one-eighth pound of elecampane is added thereto.

To prepare the mixture for use, I fill a pint bottle half full or warm water and break the rolls or sticks into it in small bits or pieces and shake until the bits are thoroughly dissolved. Then is added one-fourth pint of alcohol (or good whisky) and one-fourth pint of molasses, the whole being well shaken together and the bottle then corked. When used down to the dregs, another roll or stick is added, as before, the dregs being always left in the bottle to help preserve the efficacy and strength of the mixture. For weak lungs, coughs, colds, and the like, pure rye whisky and a sirup made from rock-candy is used instead of alcohol and molasses.

For the different characters of disease the mixture is taken in doses which vary according to the nature of the particular disease or diseases for which it is taken or administered.

Having thus described my invention, what I claim is—

A compound for the treatment of diseases herein named, composed of rhubarb, Cape aloes, (mild,) golden-seal, blue cohosh, capsicum, powdered licorice, glycerine, and elecampane, in about the proportions specified.

In testimony whereof I affix my signature in presence of two witnesses.

STEPHEN D. WILLIS.

Witnesses:
ANDREW H. GILLMORE,
JOHN B. DEEDS.